(12) United States Patent
West

(10) Patent No.: US 6,215,388 B1
(45) Date of Patent: *Apr. 10, 2001

(54) PARALLEL CONNECTED PTC ELEMENTS

(75) Inventor: Jeffrey A. West, Bellville, OH (US)

(73) Assignee: Therm-Q-Disc, Incorporated, Mansfield, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/720,076

(22) Filed: Sep. 27, 1996

(51) Int. Cl.$^7$ ...................................................... H01C 7/10
(52) U.S. Cl. ...................... 338/22 R; 338/338; 338/254; 338/260; 338/322; 338/328; 338/319; 338/205
(58) Field of Search ............................ 338/22 R, 22 SD, 338/319, 322, 204, 205, 328, 332, 254, 255, 260, 115, 99, 101

(56) References Cited

U.S. PATENT DOCUMENTS

| | | | |
|---|---|---|---|
| 996,862 | 7/1911 | Kraus | 338/319 |
| 2,143,414 | * 1/1939 | West | 338/205 |
| 3,447,118 | 5/1969 | Ferree | 338/21 |
| 3,878,501 | 4/1975 | Moorhead et al. | 338/22 R |
| 3,916,264 | * 10/1975 | Berg | 361/106 |
| 4,414,530 | 11/1983 | Bouffard et al. | 338/25 |
| 4,698,614 | 10/1987 | Welch et al. | 338/22 R |
| 4,918,421 | * 4/1990 | Lawless et al. | 338/21 |
| 5,089,688 | 2/1992 | Fang et al. | 219/505 |
| 5,233,326 | 8/1993 | Motoyoshi | 338/22 R |
| 5,262,619 | 11/1993 | Karner | 392/485 |
| 5,270,521 | 12/1993 | Shikama et al. | 219/530 |
| 5,382,938 | 1/1995 | Hansson et al. | 338/22 R |
| 5,488,348 | 1/1996 | Asida et al. | 338/22 R |
| 5,493,266 | * 2/1996 | Sasaki et al. | 338/22 R |
| 5,663,861 | 9/1997 | Reddy et al. | . |
| 5,682,130 | * 10/1997 | Styrna et al. | 338/22 R |
| 5,688,424 | * 11/1997 | Asida | 338/22 R |
| 5,691,688 | * 11/1997 | West et al. | 338/22 R |
| 5,777,541 | * 7/1998 | Vekeman | 338/22 R |

FOREIGN PATENT DOCUMENTS

| | | | |
|---|---|---|---|
| 2054487 | 2/1978 | (CA) . | |
| 944974 | 6/1956 | (DE) | 338/22 R |

* cited by examiner

Primary Examiner—Karl D. Easthom
(74) Attorney, Agent, or Firm—Harness, Dickey & Pierce, P.L.C.

(57) ABSTRACT

A plurality of PTC material layers and a plurality of metal plates are sandwiched together with one adjacent pair of metal plates connected in series through one layer of PTC material. The remaining PTC material layers are connected in parallel with the one layer by selectively interconnecting the other metal plates with the one adjacent pair of metal plates.

25 Claims, 6 Drawing Sheets

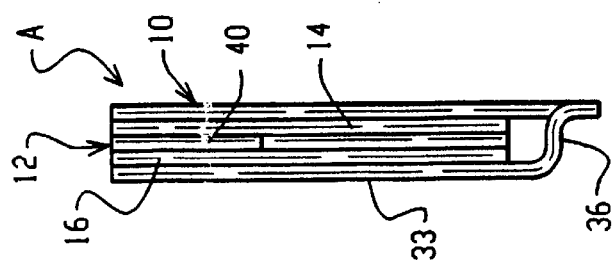
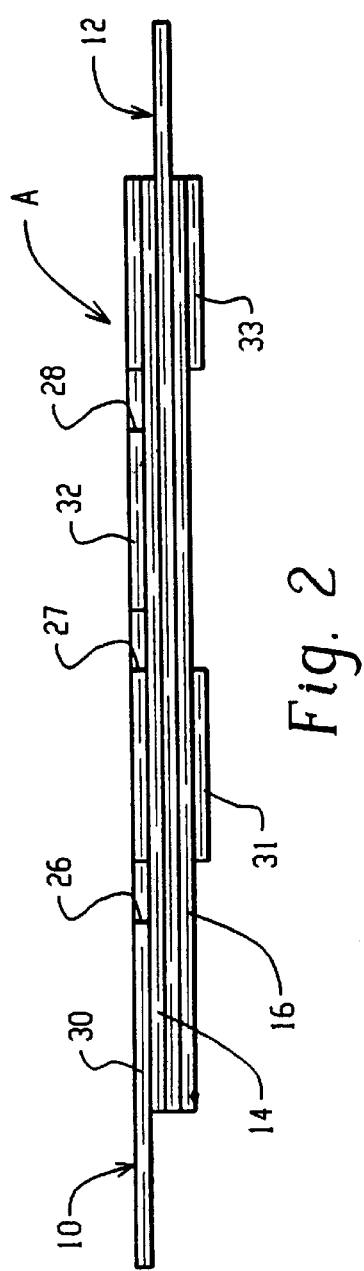
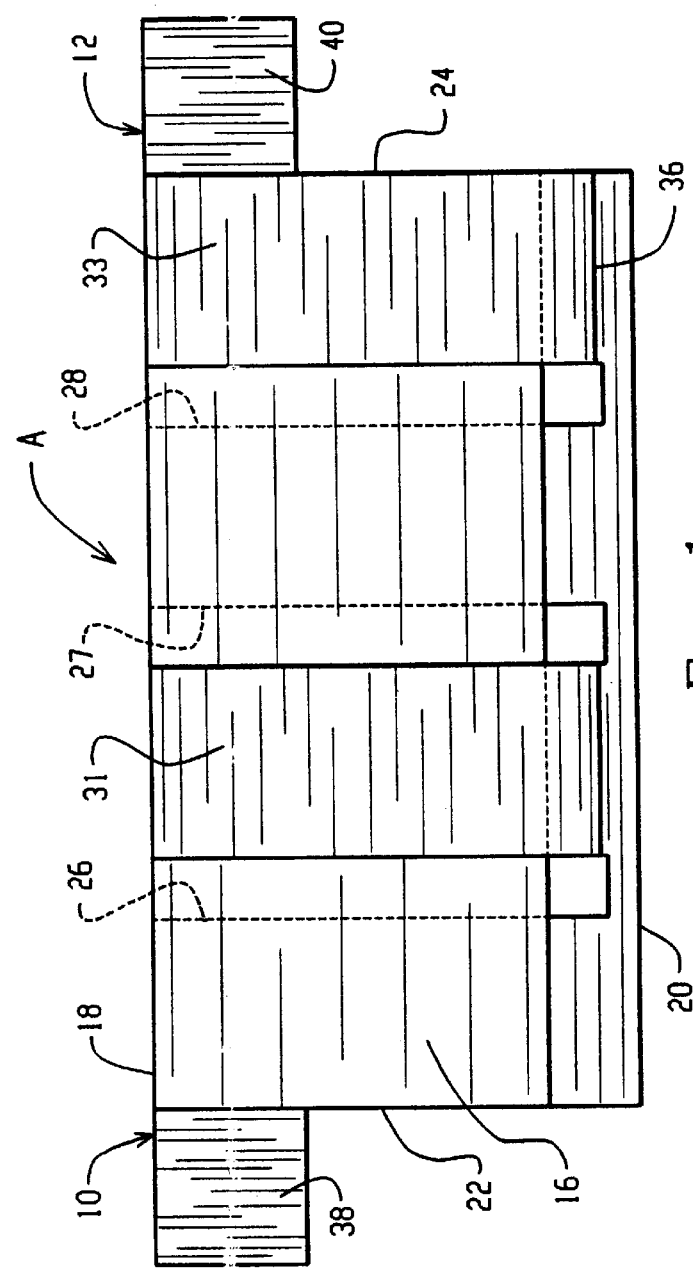

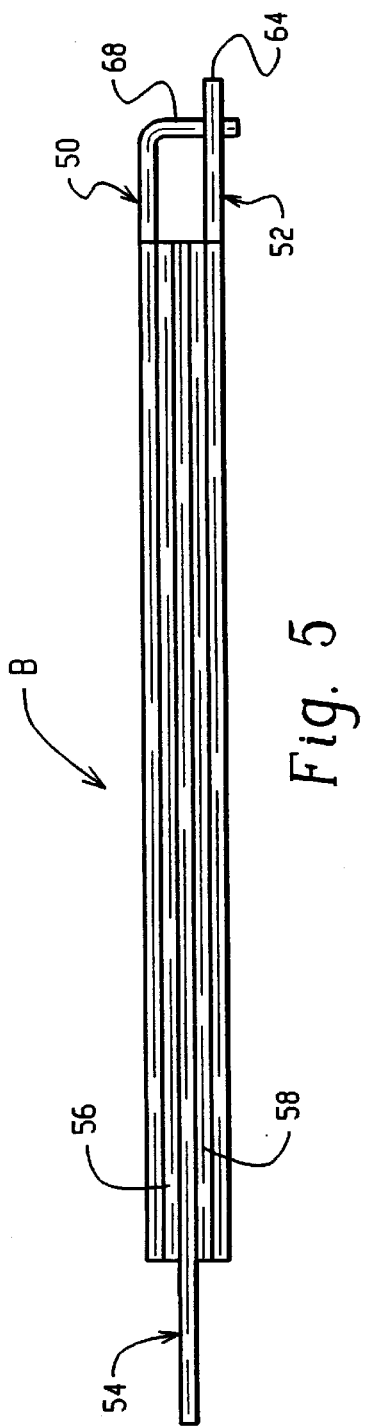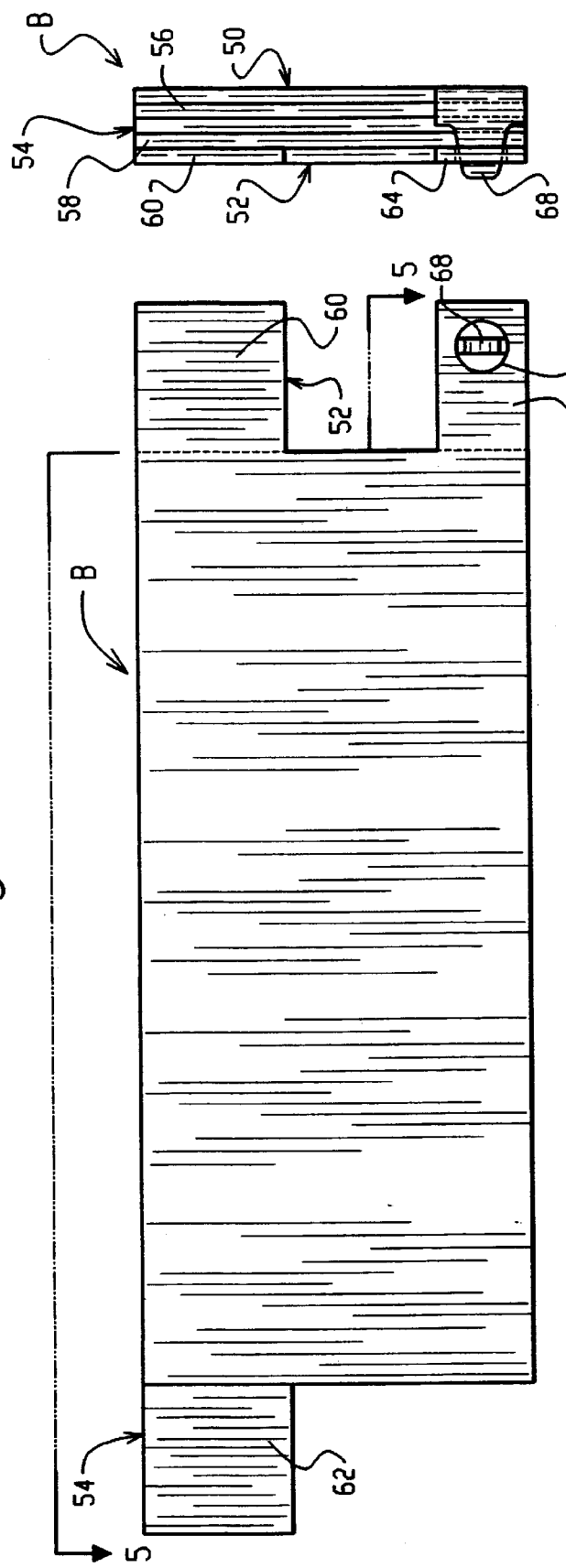

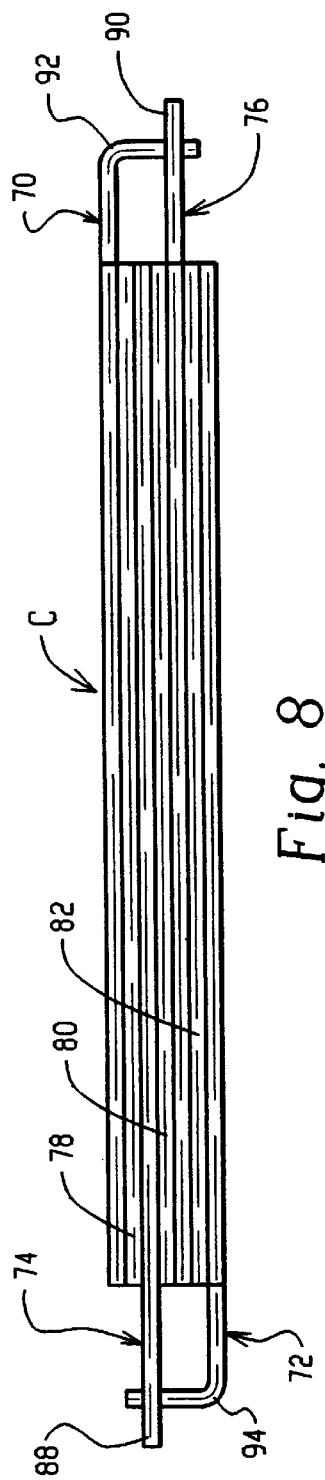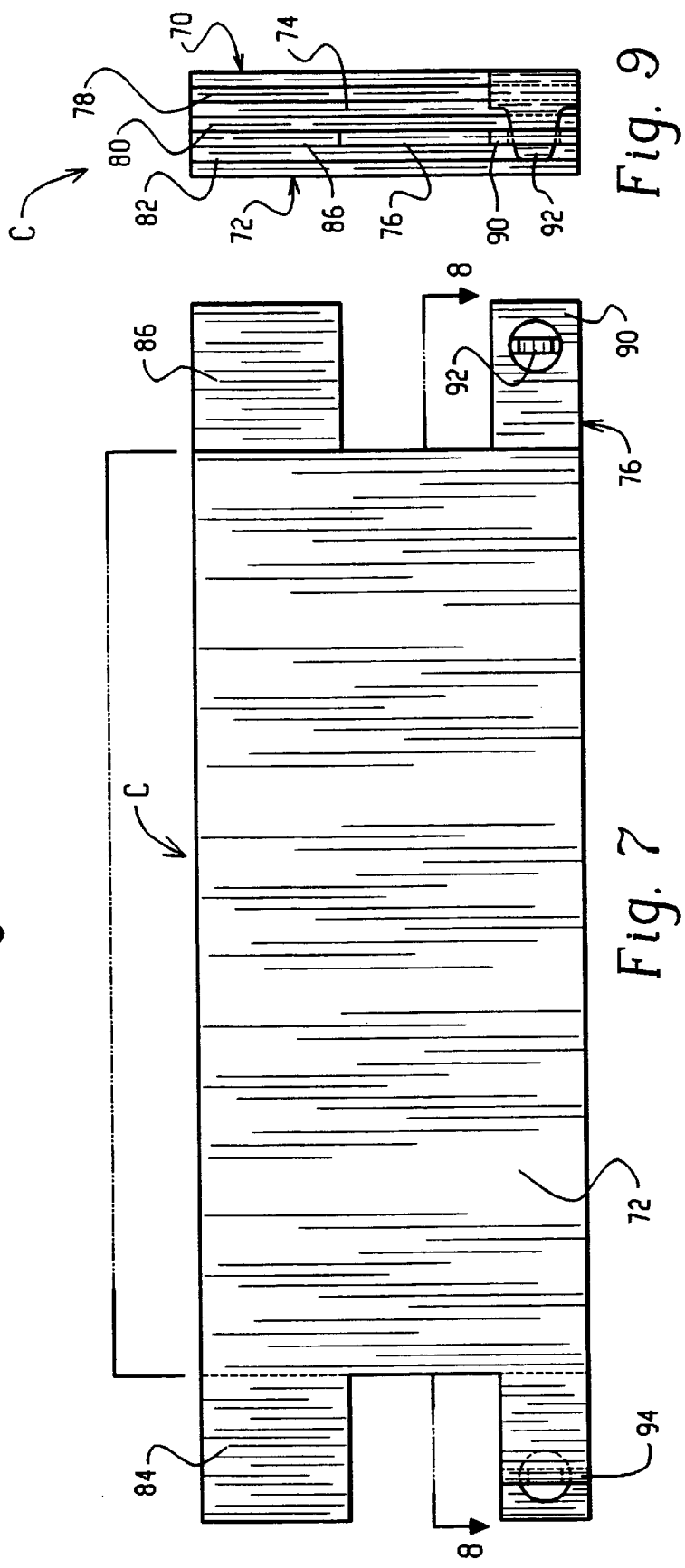

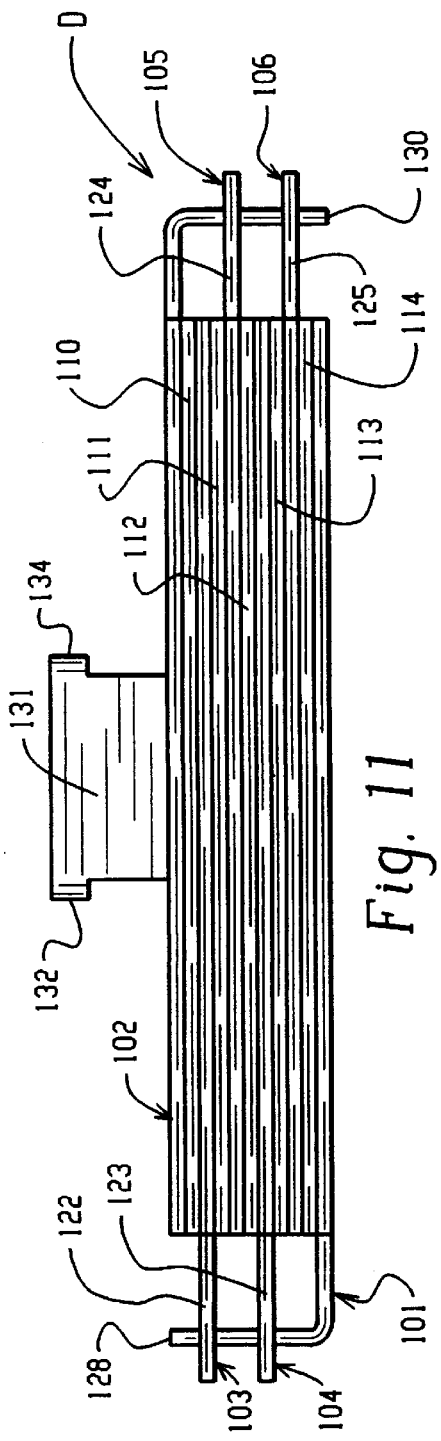
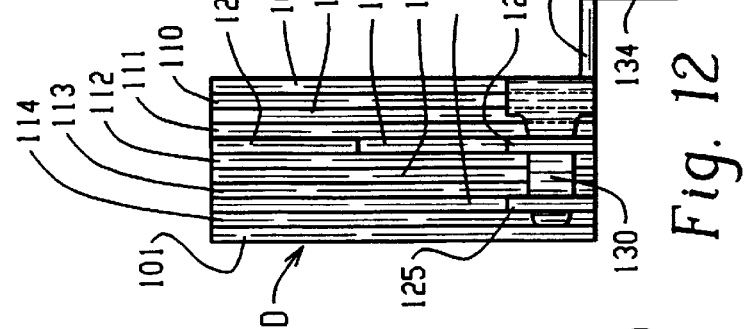
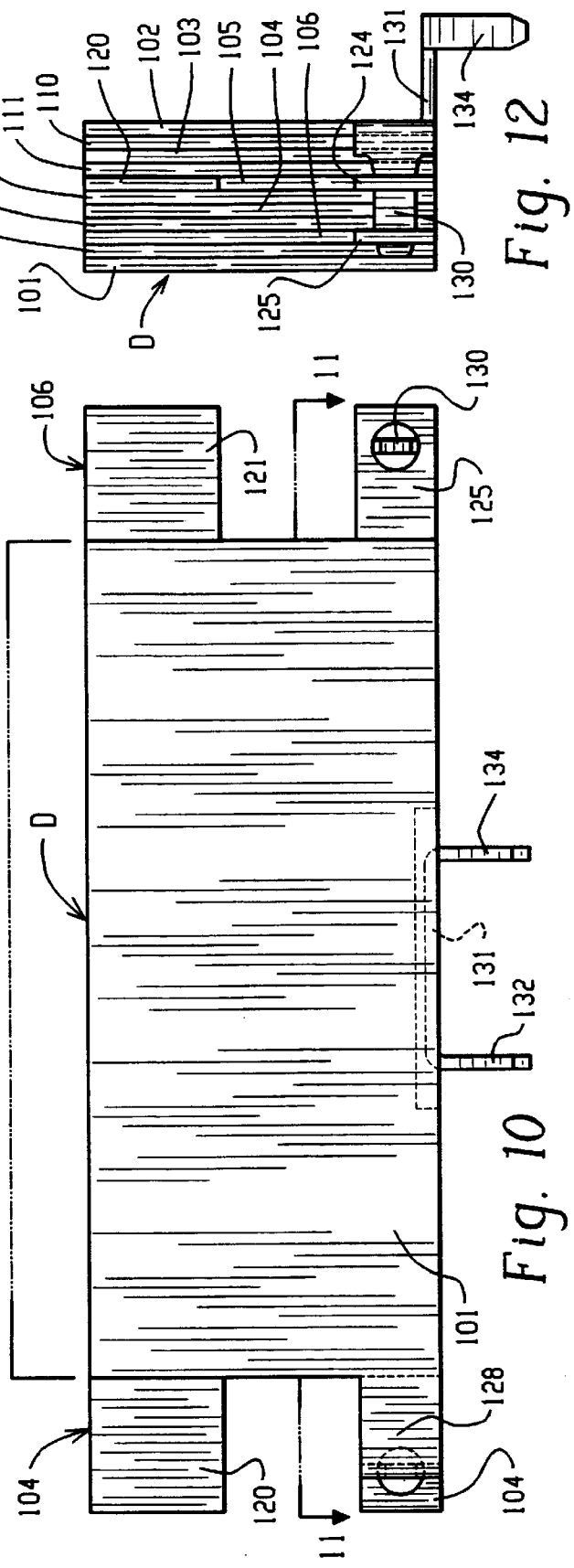
Fig. 11
Fig. 12
Fig. 10

PARALLEL CONNECTED PTC ELEMENTS

BACKGROUND OF THE INVENTIONS

This application relates to the art of thermal protectors and, more particularly, to thermal protectors having electrical current limiting capabilities. The invention will be described with particular reference to thermal protectors that include a thin sheet of polymeric compound containing carbon particles and having a positive temperature coefficient of resistance. However, it will be appreciated that the invention has broader aspects and that it is possible to use other materials having a positive temperature coefficient of resistance.

Thermal protectors that have a positive temperature coefficient of resistance are commonly referred to as PTC devices and the materials that provide such a resistance characteristic are commonly referred to as PTC materials. A thin layer of PTC material in a PTC device conducts electricity in a direction perpendicular to its thickness. Decreasing the resistance of such a PTC device during normal operation can be achieved by increasing the area of the PTC material layer. However, PTC devices must fit in confined spaces and it is not always possible to enlarge the surface area of the PTC material layer to the extent that would be necessary to provide a desired low initial resistance while still fitting in the available space.

It would be desirable to have an arrangement for enlarging the area of a PTC material layer without greatly increasing the peripheral size of a PTC device.

SUMMARY OF THE INVENTION

A PTC device of the type described has a plurality of metal plates and a plurality of PTC material layers sandwiched together with one PTC material layer connected in series between one pair of metal plates and with all of the other PTC material layers connected in parallel with the one layer. This arrangement makes it possible to adjust the total area of the PTC material while minimizing the peripheral size of the PTC device.

In a preferred arrangement, the plurality of metal plates have connecting tabs for selectively interconnecting selected ones of the plates to connect the other PTC material layers in parallel with the one layer.

In one arrangement, selected ones of the connecting tabs have openings therein for receiving a finger on other tabs. Solder is then used for securing the finger in the openings and providing good electrical continuity.

In accordance with another aspect of the application, an outer metal plate on the PTC device includes a laterally extending support projection for supporting the PTC device on a circuit board or the like. The laterally extending support projection may have spaced-apart legs extending downwardly therefrom for reception in openings in a circuit board or the like.

It is a principal object of the present invention to provide a PTC device having a PTC material area that is much larger than the area within the periphery of the PTC device.

It is also an object of the invention to provide a compact PTC device having a plurality of PTC material layers connected in parallel.

It is another object of the invention to provide a PTC device having a plurality of metal plates separated by a plurality of PTC material layers and with the plates having tabs for selective interconnection to place the PTC material layers in electrical parallel.

BRIEF DESCRIPTION OF THE DRAWING

FIG. 1 is a side elevational view of a PTC device constructed in accordance with the present application;

FIG. 2 is a top plan view of FIG. 1;

FIG. 3 is an end elevational view of FIG. 1;

FIG. 4 is a side elevational view of another embodiment;

FIG. 5 is a top plan view of FIG. 4;

FIG. 6 is an end elevational view of FIG. 4;

FIG. 7 is a side elevational view of another embodiment;

FIG. 8 is a top plan view of FIG. 7;

FIG. 9 is an end elevational view of FIG. 7;

FIG. 10 is a side elevational view of another embodiment;

FIG. 11 is a top plan view of FIG. 10;

FIG. 12 is an end elevational view of FIG. 10;

DESCRIPTION OF PREFERRED EMBODIMENTS

Figure 13:
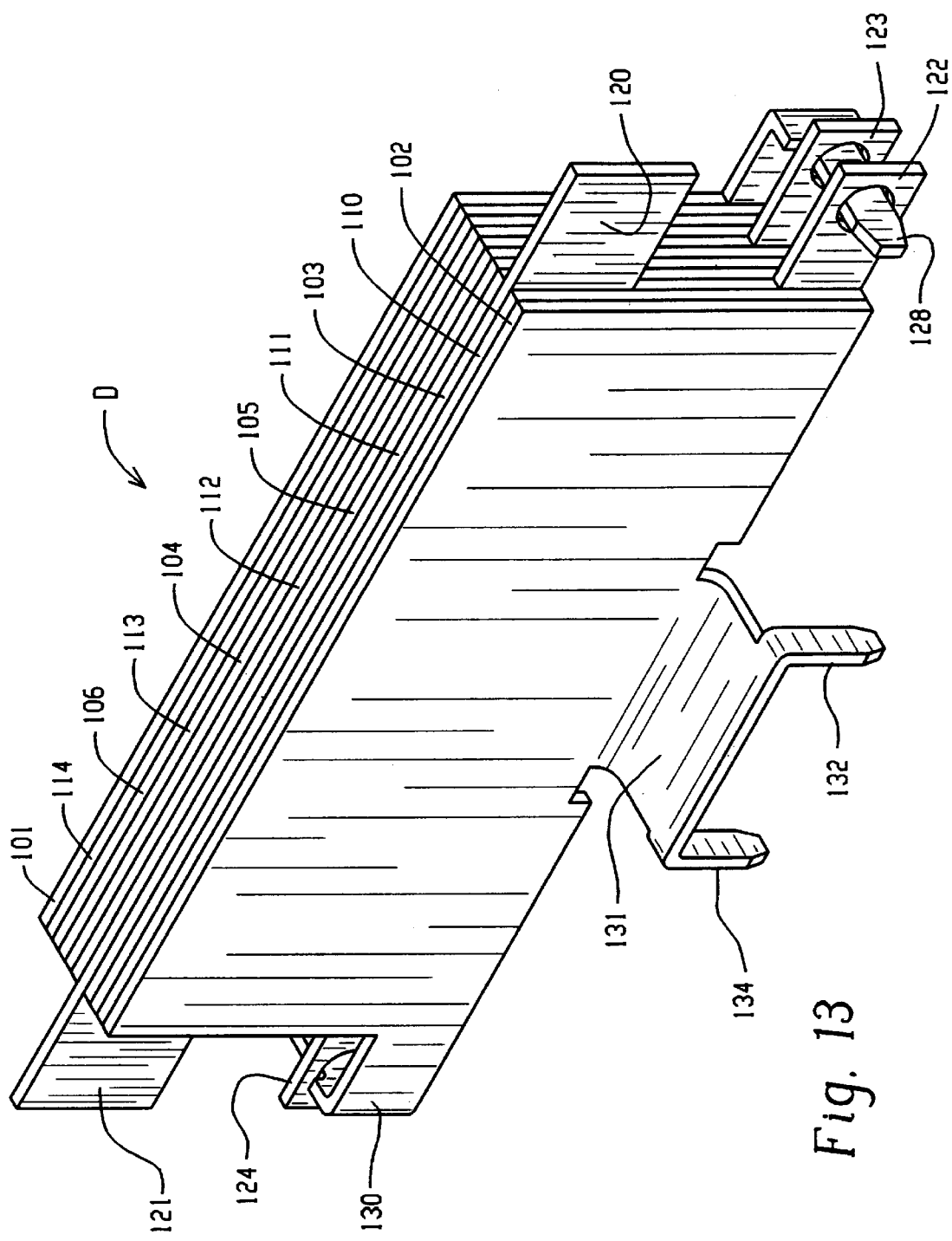
FIG. 13 is a perspective illustration of the embodiment of FIGS. 10–12.

In all embodiments of the present application, it will be recognized that each PTC material layer is a polymeric compound containing carbon particles and having a positive temperature coefficient of resistance. The PTC material has a very low resistance at normal operating temperatures and an extremely high resistance above a predetermined switching temperature. The PTC material may reach its switching temperature by self-induced $I^2R$ heating or by exposure to an elevated temperature in the surrounding environment. The PTC material automatically switches to its high resistance state at the switching temperature and effectively blocks current flow to an electrical apparatus that is protected by the PTC device. Metal foil electrodes (not shown) are bonded to both of the opposite faces of each PTC material layer and are coextensive in area with the PTC material layers. The metal plates are soldered to the foil electrodes. Thus, the PTC layers and the metal plates are bonded together at electrically conductive interfaces by way of metal foil electrodes that are bonded to the PTC layers and soldered to the metal plates. The plates and layers alternate with one another in substantially parallel relationship, and direct electrical connections between plates are provided by outwardly extending tabs on the plates. These direct electrical connections are external of the electrically conductive interfaces between layers and plates, and the PTC layers do not form part of these direct electrical connections between plates. The direct electrical connections are selectively made to place a plurality of the PTC layers in electrical parallel with one another.

In a PTC device constructed in accordance with the present application, each PTC material layer has a thickness that is preferably less than 0.05 inch and usually less than 0.02 inch. The PTC material has a switching temperature that is not less than 80° C., although it will be appreciated that the switching temperature can be much higher than 80° C. At the switching temperature, the resistivity and the resistance of the PTC device and the PTC material jumps at least several orders of magnitude. That is, the resistivity and the resistance jumps at the switching temperature to at least $10^3$ times the resistivity and the resistance of the PTC device and the PTC material at 25° C. By way of example, the resistivity of the PTC material at 25° C. is preferably not greater than 100 ohm-centimeters. At the switching temperature, the resistivity jumps to a value that is at least $10^3$ times the resistivity at 25° C. Between 25° C. and the switching temperature, the resistivity does not deviate significantly from its value at 25° C.

Referring now to the drawing, wherein the showings are for purposes of illustrating certain preferred embodiments of the invention only and not for purposes of limiting same, FIGS. 1–3 show a PTC device A having a pair of metal terminal plates 10, 12 and a pair of thin PTC material layers 14, 16.

PTC device A is rectangular and has an outer periphery that includes a top and bottom 18, 20, and opposite ends 22, 24. Metal plate 10 has vertical slots 26, 27 and 28 extending from the top thereof toward the bottom thereof that divide plate 10 into four smaller plate portions 30, 31, 32 and 33. Plate portions 31, 33 are laterally deformed, as generally indicated at 36 in FIG. 3 for plate portion 33, and positioned on the opposite side of PTC material layer 16 from plate 12.

Metal plates 10, 12 have terminal tabs 38, 40 extending outwardly from the opposite ends 22, 24 of PTC device A adjacent top 18 thereof for connecting the PTC device in a circuit. With the arrangement shown and described, PTC material layer 14 is connected in series between plate 12 and plate portions 30, 32 of plate 10. PTC material layer 16 is connected in parallel with PTC material layer 14 through laterally displaced plate portions 31, 33 of plate 10.

FIGS. 4–6 show a PTC device B having outer metal plates 50, 52 and an intermediate metal plate 54. PTC material layer 56 is between plates 50, 54 and PTC material layer 58 is between plates 52, 54. Plates 52, 54 define terminal plates having terminal tabs 60, 62 extending outwardly from the ends thereof adjacent the top of the PTC device for connecting PTC material layer 58 in series between plates 52, 54. Terminal plate 52 has a connecting tab 64 extending outwardly from the same end thereof as terminal tab 60 and an opening 66 is provided in connecting tab 64. Plate 50 has an outwardly and laterally extending finger 68 thereon that projects through opening 66 in connecting tab 64. Solder is applied to finger 68 and connecting tab 64 to make a good electrical connection between plates 50, 52 so that PTC material layer 56 is connected in electrical parallel with PTC material layer 58.

FIGS. 7–9 show a PTC device C having outer metal plates 70, 72 and intermediate plates 74, 76. PTC material layer 78 is located between plates 70, 74. PTC material layer 80 is located between plates 74, 76. PTC material layer 82 is located between plates 72, 76. Plates 74, 76 have terminal tabs 84, 86 extending outwardly from the ends of PTC device C adjacent the top thereof for connecting terminal plates 74, 76 in series across one PTC material layer 80. Terminal plates 74, 76 have bottom connecting tabs 88, 90 extending outwardly from the opposite ends of PTC device C adjacent the bottom thereof, and suitable openings are provided in connecting tabs 88, 90. Laterally extending tab fingers 92, 94 on outer plates 70, 72 are received in the openings in tabs 88, 90 and suitably soldered thereto. This connects PTC material layers 78, 82 in parallel with PTC material layer 80.

Figure 14:
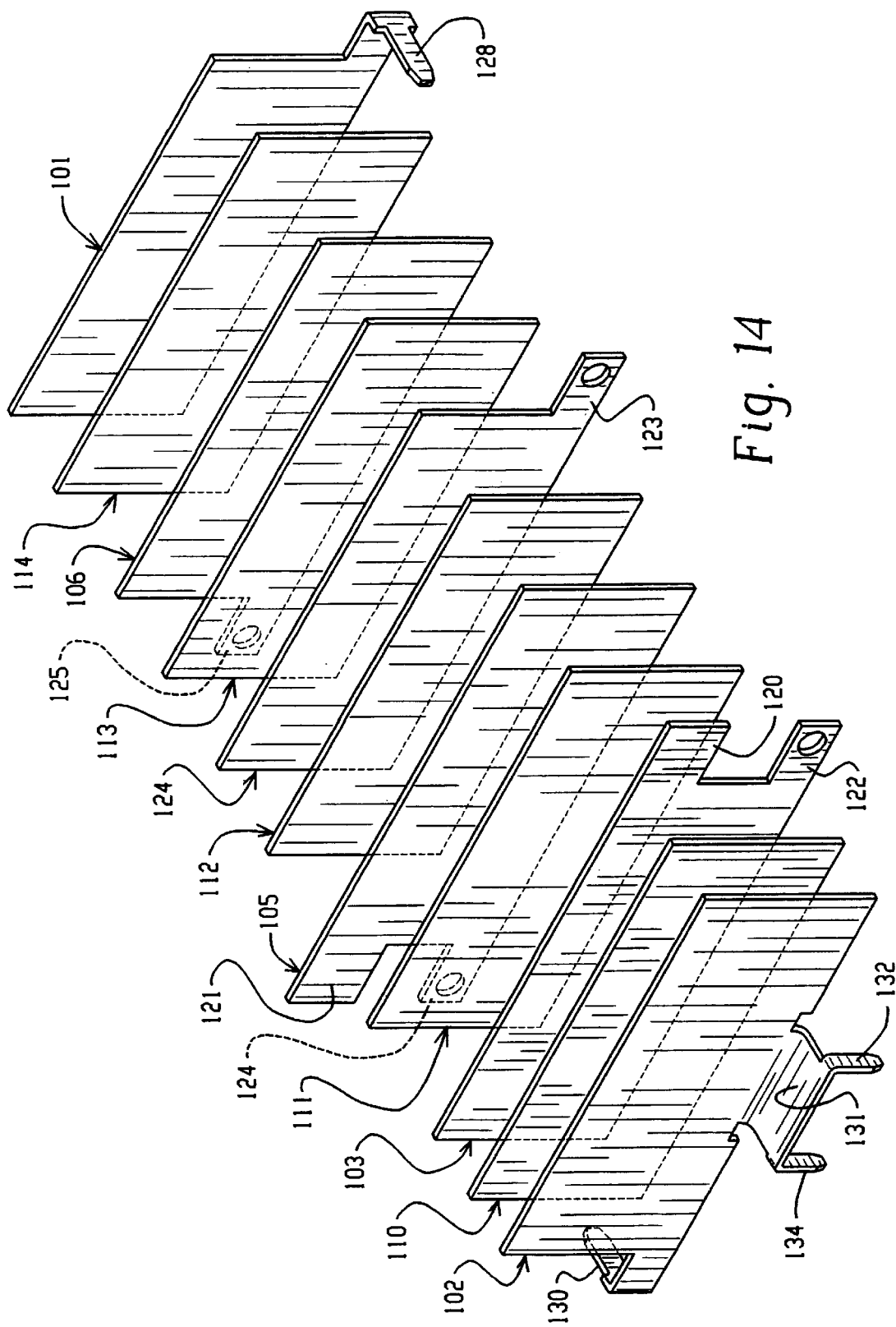
FIG. 14 is an exploded perspective illustration of the embodiment of FIG. 13.

FIGS. 1014 14 show a PTC device D having outer metal plates 101, 102 and intermediate metal plates 103, 104, 105 and 106. PTC material layer 110 is located between plates 102, 103. PTC material layer 111 is located between plates 103, 105. PTC material layer 112 is located between plates 104, 105. PTC material layer 113 is located between plates 104, 106. PTC material layer 114 is located between plates 101, 106.

Plates 103, 105 define terminal plates and have terminal tabs 120, 121 extending outwardly from the opposite ends thereof adjacent the top of PTC device D. Terminal plates 103, 105, along with intermediate plates 104, 106, have outwardly extending connecting tabs 122, 124, 123 and 125 extending outwardly from the ends thereof. Suitable openings are provided in tabs 122–125 for receiving laterally extending tab fingers 128, 130 on outer plates 101, 102, and solder is applied for making good electrical connections.

Terminal plates 103, 105 are connected in series across PTC material layer 111 when terminal tabs 84, 86 are connected in series in a circuit. All of the other PTC material layers 110, 112, 113 and 114 are connected in parallel with the one PTC material layer 111.

A bottom support projection 131 is bent laterally outwardly from outer support plate 102 for supporting PTC device D on a circuit board or the like. In the arrangement shown, a pair of spaced-apart legs 132, 134 extend downwardly from support projection 131 for reception in openings in a circuit board or the like.

When terminal tabs 120, 121 on terminal plates 103, 105 are connected in a circuit so that PTC material layer 111 conducts current in a direction from plate 103 toward plate 105, all of the other PTC material layers except one conduct current in an opposite direction. PTC material layer 110 conducts current in a direction from terminal plate 103 to outer plate 102. PTC material layer 112 conducts current in a direction from plate 104 toward terminal plate 105. PTC material layer 113 conducts current in a direction from plate 104 toward plate 106. PTC material layer 114 conducts current in a direction from outer plate 101 toward plate 106.

Tab and finger integrally formed connections are provided by tab 64 and finger 68 in FIGS. 4–6, by tabs 88, 90 and fingers 92, 94 in FIGS. 7–9, and by tabs 122, 123, 124, 125 and fingers 128, 130 in FIGS. 10–14. These tab and finger relationships provide direct parallel connections external to the interfaces between layers and plates, and connect the plural PTC layers in parallel. These direct parallel connections are part of the PTC device as manufactured and existing prior to incorporation of the PTC device in an electrical circuit, and are continuous and uninterruptable by way of switches or another interrupting device.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A PTC device comprising a plurality of metal plates greater than two and a plurality of PTC material layers, said plates and layers having opposed facing surfaces and alternating with one another in parallel relationship with said layers and plates bonded to each other at electrically conductive interfaces between said layers and plates, each of said plates including an integrally formed portion extending outwardly from said electrically conductive interfaces, an adjacent pair of plates in said plurality of metal plates being connected in electrical series across one layer of said plurality of PTC material layers, alternating ones of said plurality of metal plates being interconnected by forming said integrally formed portions into interengaging relationship whereby the remaining plates of said plurality of metal plates are connected with one or the other of the plates in said one pair of plates other than through a said PTC material layer by way of direct parallel connections that are external to said opposing surfaces between said layers and plates and the remaining layers of said plurality of PIC material layers being connected in electrically parallel relationship with said one layer, said direct parallel connections being part of said PTC device as manufactured and existing prior to incorporation of said PTC device in an electrical circuit, said direct parallel connections being continuous and uninterruptable by way of switches or another interrupting device.

2. The PTC device of claim 1 wherein said plurality of metal plates includes a support plate having a support projection thereon that extends laterally of said support plate for supporting said PTC device on a circuit board.

3. The PTC device of claim 2 including a pair of spaced-apart legs extending from said support projection in a direction transversely of said support projection and away from said PTC device.

4. The PTC device of claim 1 wherein said plurality of metal plates have connecting tabs for selectively interconnecting selected ones of said plurality of metal plates.

5. The PTC device of claim 4 wherein selected ones of said connecting tabs have an opening therein and selected others of said tabs have a finger received in said opening.

6. The PTC device of claim 1 wherein said plurality of metal plates include a pair of opposite outer plates and one plate in said adjacent pair of plates that are connected in electrical series comprises one of said outer plates.

7. The PTC device of claim 1 wherein said plurality of metal plates include a pair of opposite outer plates that are separate and independent of said adjacent pair of plates that are connected in electrical series.

8. A PTC device comprising a plurality of PTC material layers greater than two and a plurality of metal plates greater than three, said layers and plates having opposed facing surfaces alternating with one another in parallel relationship with said layers and plates bonded to each other at electrically conductive interfaces between said layers and plates, each of said plates including an integrally formed portion extending outwardly from said electrically conductive interfaces, one adjacent pair of plates in said plurality of metal plates being connected in electrical series through one layers in said plurality of PTC material layers, alternating ones of said plurality of metal plates being interconnected by forming said integrally formed portions into interengaging relationship whereby the remaining layers in said plurality of PTC material layers are connected in electrically parallel relationship with said one layer by direct parallel connections between said plates that are external to said opposed facing surfaces between said plates and layers, said direct parallel connections being part of said PTC device as manufactured and existing prior to incorporation of said PTC device in an electrical circuit, said direct parallel connections being continuous and uninterruptable by way of switches or another interrupting device.

9. The PTC device of claim 8 wherein said one layer conducts current in one direction from one of said adjacent pair of plates to the other of said adjacent pair of plates, and a plurality of layers in said remaining layers conduct current in a direction opposite to said one direction.

10. A PTC device comprising a plurality of metal plates and a plurality of PTC material layers sandwiched together in parallel relationship with each pair of adjacent plates separated by a layer of PTC material which is electrically connected thereto, at least two of said plurality of metal plates having connecting tabs extending outwardly therefrom, and a plurality of layers being connected to one another in electrically parallel relationship by selective direct parallel interengaging connections between said tabs, said direct parallel connections being part of said PTC device as manufactured and existing prior to incorporation of said PTC device in an electrical circuit, said direct parallel connections being continuous and uninterruptable by way of switches or another interrupting device.

11. The PTC device of claim 10 wherein one of said tabs includes an opening and another of said tabs includes a transversely extending finger received in said opening said one of said tabs and said finger being connected together in electrically conductive relationship.

12. A PTC device comprising a pair of PTC material layers sandwiched between a pair of outer terminal plates, an intermediate plate sandwiched between and bonded to each of said PTC material layers, and each of said terminal plates having an integrally formed portion extending outwardly from said electrically conductive interface, said terminal plates being electrically connected with one another by way of said integrally formed portions being positioned in interengaging relationship to form a direct connection other than through one of said PTC material layers, said direct connection being external of the interfaces between said layers and plates, said direct connection being part of said PTC device as manufactured and existing prior to incorporation of said PTC device in an electrical circuit, said direct connection being continuous and uninterruptable by way of switches or another interrupting device.

13. The PTC device of claim 12 wherein said outer terminal plates are each defined by a single plate having a main portion and a displaced portion that is offset in relationship to said main portion.

14. The PTC device of claim 12 wherein said outer plates having connecting tabs thereon, one of said tabs having an opening therein and the other of said tabs having a transversely extending finger received in said opening, said one of said tabs and said finger being connected together in electrically conductive relationship.

15. A PTC device comprising a pair of outer plates, a plurality of intermediate plates and a plurality of PTC material layers all having opposing surfaces sandwiched together in parallel relationship with a PTC material layer between each pair of adjacent plates, said PTC layer being electrically connected to each of said adjacent plates, an adjacent pair of said intermediate plates being connected in electrical series by one layer of said PTC material layers to define a pair of terminal plates, said outer plates being selectively connected with one or the other of said pair of terminal plates by way of integrally formed portions provided on said outer plates and said intermediate plates and extending outwardly from the interface between said plates and said PTC layer, selected ones of said integrally formed portions being positioned in interengaging relationship to form a direct parallel connection other than through one of said PTC material layers to place the remaining layers of said PTC material layers in electrically parallel relationship with said one layer, said direct parallel connection being external of said opposing surfaces between said layers and plates, said direct parallel connection being part of said PTC device as manufactured and existing prior to incorporation of said PTC device in an electrical circuit, said direct parallel connection being continuous and uninterruptable by way of a switch or another interrupting device.

16. The PTC device of claim 15 wherein said terminal plates and said outer plates have connecting tabs extending outwardly therefrom, said tabs being connected together to provide said direct parallel connection.

17. The PTC device of claim 16 wherein selected ones of said tabs have openings therein and the remainder of said tabs have transversely extending fingers received in said openings, said fingers and said selected ones of said tabs being connected together in electrically conductive relationship.

18. The PTC device of claim 15 wherein one of said outer plates has a transversely extending support projection thereon for supporting said PTC device on a circuit board.

19. The PTC device of claim 18 including support legs extending from said support projection in a direction transversely of said support projection and away from said PTC device.

20. The PTC device of claim 1 wherein said plates and layers are bonded together at electrically conductive interfaces by way of metal foil electrodes that are bonded to said PTC layers and soldered to said metal plates.

21. The PTC device of claim 8 wherein said plates and layers are bonded together at electrically conductive interfaces by way of metal foil electrodes that are bonded to said PTC layers and soldered to said metal plates.

22. The PTC device of claim 10 wherein said plates and layers are bonded together at electrically conductive interfaces by way of metal foil electrodes that are bonded to said PTC layers and soldered to said metal plates.

23. The PTC device of claim 12 wherein said plates and layers are bonded together at electrically conductive interfaces by way of metal foil electrodes that are bonded to said PTC layers and soldered to said metal plates.

24. The PTC device of claim 15 wherein said plates and layers are bonded together at electrically conductive interfaces by way of metal foil electrodes that are bonded to said PTC layers and soldered to said metal plates.

25. A PTC device comprising a plurality of metal plates and a plurality of PTC material layers, said plates and layers having opposed facing surfaces alternating with one another in parallel relationship with said layers and plates forming electrically conductive interfaces therebetween, a first of said plates having first and second edges, a plurality of spaced slots extending inwardly from said first edge to form a plurality of plate portions interconnected by said second edge, selected ones of said plate portions engaging a surface of a first of said PTC material layers to form an electrically conductive interface therewith and others of said plate portions engaging an oppositely facing surface of a second of said plurality of PTC material layers to form an electrically conductive interface therewith, and a second plate positioned between said first and second PTC material layers, said first and second plates being electrically connected in series through said first and second PTC material layers.

* * * * *

UNITED STATES PATENT AND TRADEMARK OFFICE
CERTIFICATE OF CORRECTION

PATENT NO.   : 6,215,388 B1
DATED        : April 10, 2001
INVENTOR(S)  : Jeffrey A. West It is certified that error appears in the above-identified patent and that said Letters Patent is hereby corrected as shown below:

Title page,
Item [73], Assignee, "Therm-Q-Disc" should be -- Therm-O-Disc --.

Column 3,
Line 60, "1014 14" should be -- 10-14 --.

Column 4,
Line 37, after "relationships" insert -- are interengaging and --.

Column 5,
Line 3, "PIC" should be -- PTC --.

Signed and Sealed this

Thirty-first Day of December, 2002

JAMES E. ROGAN
*Director of the United States Patent and Trademark Office*